United States Patent
Lee

(10) Patent No.: US 10,989,799 B2
(45) Date of Patent: Apr. 27, 2021

(54) RADAR AND ANTENNA BUILT IN RADAR

(71) Applicant: BITSENSING INC., Seoul (KR)

(72) Inventor: Jae Eun Lee, Seoul (KR)

(73) Assignee: BITSENSING INC., Seoul (KR)

( * ) Notice: Subject to any disclaimer, the term of this patent is extended or adjusted under 35 U.S.C. 154(b) by 0 days.

(21) Appl. No.: 16/673,202

(22) Filed: Nov. 4, 2019

(65) Prior Publication Data

US 2020/0072956 A1 Mar. 5, 2020

Related U.S. Application Data

(63) Continuation of application No. PCT/KR2019/007747, filed on Jun. 26, 2019.

(30) Foreign Application Priority Data

Jun. 27, 2018 (KR) .................. 10-2018-0074235
Jun. 25, 2019 (KR) .................. 10-2019-0075666

(51) Int. Cl.
*G01S 13/08* (2006.01)
*G01S 7/03* (2006.01)
(Continued)

(52) U.S. Cl.
CPC .............. *G01S 13/08* (2013.01); *G01S 7/032* (2013.01); *G01S 13/931* (2013.01);
(Continued)

(58) Field of Classification Search
None
See application file for complete search history.

(56) References Cited

U.S. PATENT DOCUMENTS

| 2016/0033632 A1* | 2/2016 | Searcy ............... G01S 13/4454 342/153 |
| 2017/0082730 A1* | 3/2017 | Kishigami ........... H01Q 21/061 |
| 2018/0151961 A1* | 5/2018 | Lim ........................ G01S 7/03 |

FOREIGN PATENT DOCUMENTS

| CN | 107076832 A | 8/2017 |
| JP | 2017058359 A | 3/2017 |

(Continued)

OTHER PUBLICATIONS

International Search Report for PCT/KR2019/007747 dated Oct. 2, 2019.

(Continued)

*Primary Examiner* — Whitney Moore
(74) *Attorney, Agent, or Firm* — Dinsmore & Shohl LLP; Yongsok Choi, Esq.

(57) ABSTRACT

A radar includes a transmitter antenna unit that includes multiple transmitter antennas; a receiver antenna unit that includes a first receiver antenna group including multiple first receiver antennas and multiple second receiver antennas arranged at a first horizontal interval and a second receiver antenna group including multiple third receiver antennas arranged at one or more second horizontal intervals; a transceiver that transmits sending signals through the transmitter antenna unit and receives returning signals reflected from a target object trough the receiver antenna unit; and a processing unit that derives information about the target object by processing the received returning signals.

12 Claims, 10 Drawing Sheets

(51) Int. Cl.
　　　*G01S 13/931*　　(2020.01)
　　　*H01Q 1/32*　　(2006.01)
　　　*H01Q 3/26*　　(2006.01)
　　　*H01Q 21/22*　　(2006.01)
　　　*H04B 7/0413*　　(2017.01)

(52) U.S. Cl.
　　　CPC ......... *H01Q 1/3233* (2013.01); *H01Q 3/2605* (2013.01); *H01Q 21/22* (2013.01); *H04B 7/0413* (2013.01)

(56) References Cited

FOREIGN PATENT DOCUMENTS

| | | | |
|---|---|---|---|
| JP | 2017073672 | A | 4/2017 |
| KR | 1020130085303 | A | 7/2013 |
| KR | 1020140100774 | A | 8/2014 |
| KR | 20180060342 | A | 6/2018 |
| KR | 1020180060341 | A | 6/2018 |
| KR | 20190058072 | A | 5/2019 |
| WO | 03043123 | A1 | 5/2003 |

OTHER PUBLICATIONS

Extended European Search Report for EP application No. 19794862.3 dated Jan. 15, 2021.
Duan Ya-Nan, et al., "Optimizing Planar Array in MIMO-SAR Radar Using Genetic Algorithm," IEEE International Geoscience and Remote Sensing Symposium (IGARSS), Beijing, China, Jul. 10, 2016, pp. 1206-1209.
Jian Dong, et al., "MIMO Radar Array Thinning Using Almost Difference Sets," 10th European Conference on Antennas and Propagation (EuCAP), Davos, Switzerland, Apr. 10, 2016, pp. 1-2.

\* cited by examiner

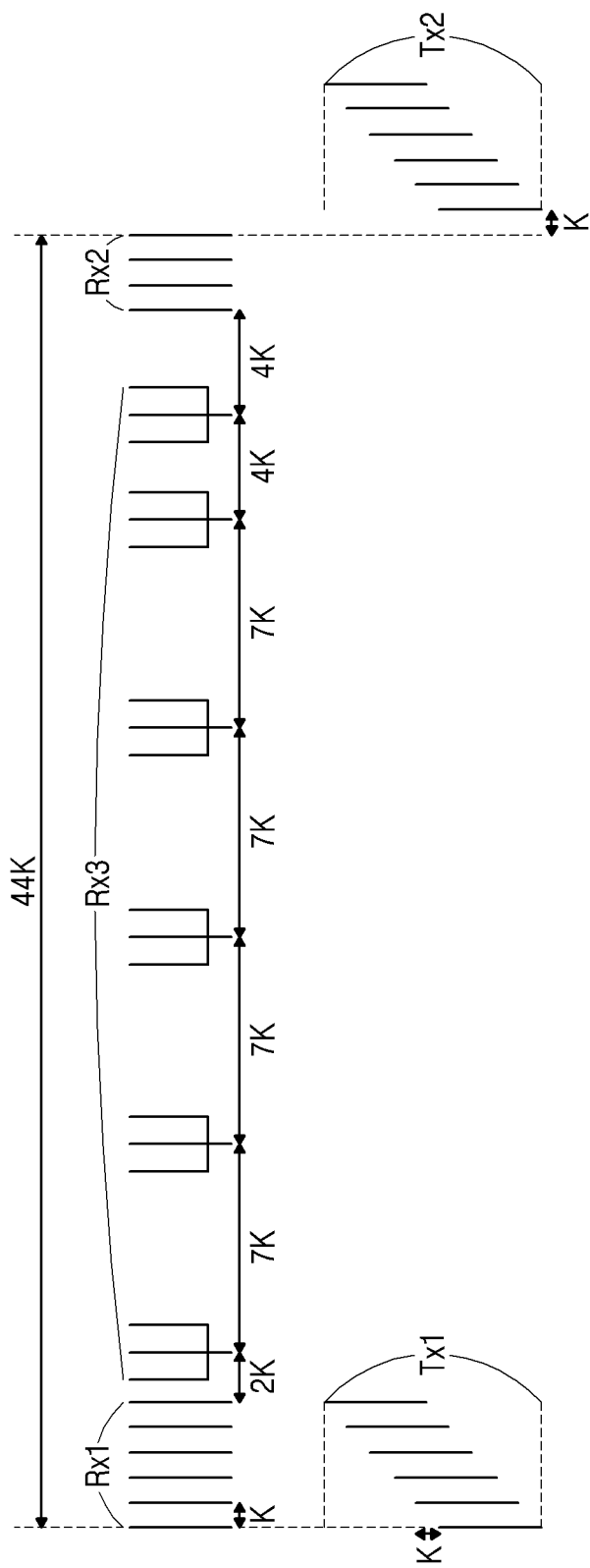

RADAR AND ANTENNA BUILT IN RADAR

CROSS-REFERENCE TO RELATED APPLICATION

This application is a continuation application of International Application No. PCT/KR2019/007747 filed on Jun. 26, 2019, which claims priority to Korean Patent Application No. 10-2018-0074235 filed on Jun. 27, 2018 in the Korean Intellectual Property Office, and Korean Patent Application No. 10-2019-0075666 filed on Jun. 25, 2019 in the Korean Intellectual Property Office, the entire disclosures of which are incorporated herein by reference for all purposes.

TECHNICAL FIELD

The present disclosure relates to a radar and an antenna built in the radar.

BACKGROUND

In general, a radar needs to have high angular resolution to detect or track the distance, speed, and angle of a target device by transmitting and receiving electromagnetic waves. Conventional radars have a structure in which multiple receiver antennas are arrayed to increase angular resolution. However, a radar having this array needs large-size antennas and a lot of components connected to a transceiver. Therefore, the overall size of the radar increases.

Prior Art Document 1: Korean Patent Laid-open Publication No. 2019-0058072 (published on May 29, 2019)

SUMMARY

In view of the foregoing, the present disclosure provides a radar with improved angular resolution in horizontal and vertical directions for long-range, mid-range and short-range detection by efficiently arranging multiple transmitter antennas and multiple receiver antennas. The problems to be solved by the present disclosure are not limited to the above-described problems. There may be other problems to be solved by the present disclosure.

According to an exemplary embodiment, a radar may include a transmitter antenna unit that includes multiple transmitter antennas; a receiver antenna unit that includes a first receiver antenna group including multiple first receiver antennas and multiple second receiver antennas arranged at a first horizontal interval and a second receiver antenna group including multiple third receiver antennas arranged at one or more second horizontal intervals; a transceiver that transmits sending signals through the transmitter antenna unit and receives returning signals reflected from a target object trough the receiver antenna unit; and a processing unit that derives information about the target object by processing the received returning signals.

According to another exemplary embodiment, an antenna built in a radar may include a transmitter antenna unit that includes multiple transmitter antennas; and a receiver antenna unit that includes a first receiver antenna group including multiple first receiver antennas and multiple second receiver antennas arranged at a first horizontal interval and a second receiver antenna group including multiple third receiver antennas arranged at one or more second horizontal intervals.

The above-described exemplary embodiments are provided by way of illustration only and should not be construed as liming the present disclosure. Besides the above-described exemplary embodiments, there may be additional exemplary embodiments described in the accompanying drawings and the detailed description.

According to the present disclosure, it is possible to improve angular resolution in horizontal and vertical directions for long-distance and near-field detection by efficiently arranging multiple transmitter antennas and multiple receiver antennas.

Further, according to the present disclosure, the multiple transmitter antennas are vertically spaced away with a vertical offset, and, thus, it is possible to precisely detect information about an object in the vertical direction.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 2 illustrates a first example of the array of multiple transmitter antennas and multiple receiver antennas of an antenna apparatus included in a radar in accordance with various embodiments described herein.

DETAILED DESCRIPTION

Figure 1:
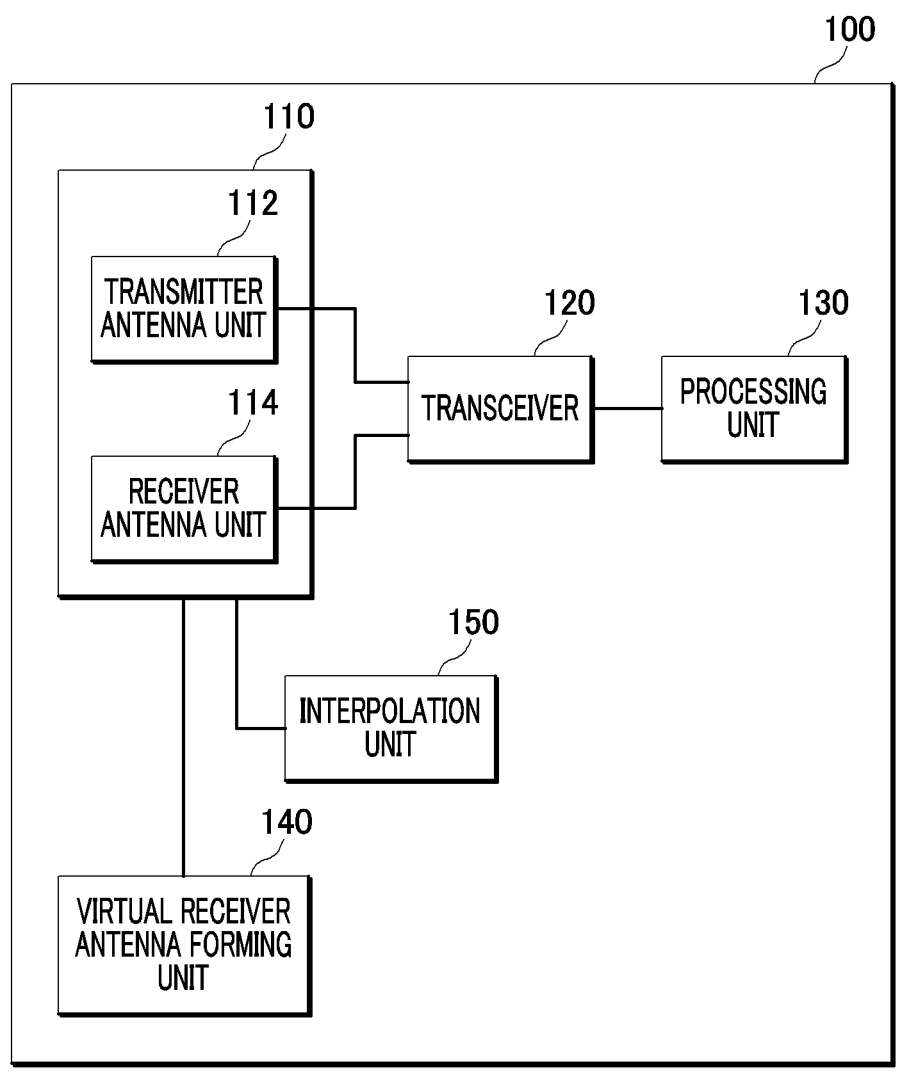
FIG. 1 is a block diagram of a radar in accordance with various embodiments described herein.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the term "comprises or includes" and/or "comprising or including" used in the document means that one or more other components, steps, operation and/or the existence or addition of elements are not excluded from the described components, steps, operation and/or elements unless context dictates otherwise; and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the server.

Hereafter, an exemplary embodiment of the present disclosure will be described in detail with reference to the accompanying drawings.

FIG. 1 is a block diagram of a radar 100 in accordance with various embodiments described herein.

Referring to FIG. 1, the radar 100 may include an antenna apparatus 110, a transceiver 120, a processing unit 130, a virtual receiver antenna forming unit 140, and an interpolation unit 150.

Hereafter, FIG. 1 will be described with reference to FIG. 2.

The radar 100 may be installed at a specific position of a vehicle and configured to transmit a sending signal through the antenna apparatus 110, receive a receive signal reflected and returning from a target object around the vehicle, and detect the presence or absence, position, direction, or size of the target object. The target object detection result obtained by the radar 100 can be used to accurately control a vehicle system by applying it to the vehicle system that provides a collision avoidance function for avoiding a collision with a vehicle ahead, a safe lane change function, or the like.

The antenna apparatus 110 includes a transmitter antenna unit 112 including multiple transmitter antennas arranged in a vertical direction and a receiver antenna unit 114 including multiple receiver antennas arranged in a horizontal direction.

The transmitter antenna unit 112 may include multiple transmitter antennas Tx1 and Tx2 that transmit sending signals to detect a target object. More specifically, the transmitter antenna unit 112 may include a first transmitter antenna group Tx1 arranged on the same line as the array of multiple first receiver antennas Rx1 and a second transmitter antenna group Tx2 spaced away by a first horizontal distance from the array of multiple second receiver antennas Rx2.

Figure 6:
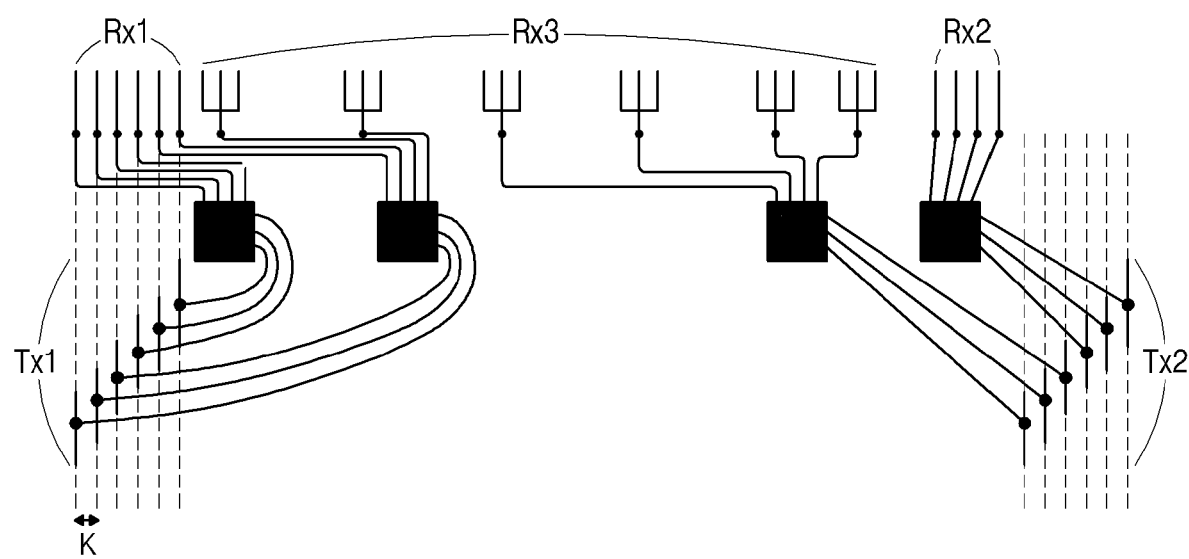
FIG. 6 is a diagram illustrating a chip to which the first example of the present disclosure is applied.

The multiple transmitter antennas Tx1 and Tx2 may be spaced away from each other by a predetermined distance in a vertical direction and a horizontal direction and may have a phase difference in the vertical direction and the horizontal direction. In this case, each of the multiple transmitter antennas Tx1 and Tx2 can perform beamforming of sending signals in the vertical direction by a phase shift. Herein, the beamforming of sending signals in the vertical direction can be performed by transmitting the sending signals through the multiple transmitter antennas Tx1 and Tx2 which are spaced away from each other by a predetermined distance in the vertical direction and have a phase difference in the vertical direction. For example, referring to FIG. 6, multiple transmitter antennas included in each of the first transmitter antenna group Tx1 and the second transmitter antenna group Tx2 connected to multiple chips may compensate for a phase difference caused by a horizontal direction distance by a phase shift and then perform beamforming of sending signals in the vertical direction. In this case, if a binary phase shift is simultaneously applied to the first transmitter antenna group Tx1 and the second transmitter antenna group Tx2, multiple-input multiple-output (MIMO) can be implemented simultaneously. In a first example shown in FIG. 6, an antenna structure including transmitter antennas and receiver antennas is implemented by using four chips, and when the four chips are cascaded, an additional chip may be used as a master chip for synchronization.

The multiple transmitter antennas included in each of the first transmitter antenna group Tx1 and the second transmitter antenna group Tx2 may be arranged in a row in the vertical direction at a first horizontal interval. Further, the multiple transmitter antennas included in each of the first transmitter antenna group Tx1 and the second transmitter antenna group Tx2 may be spaced away with a vertical offset at a vertical interval equal in size to the first horizontal interval. For example, if the vertical interval is 0.5 lambda, the multiple transmitter antennas included in each of the first transmitter antenna group Tx1 and the second transmitter antenna group Tx2 may be formed into an antenna pattern having a total vertical area of 2.5 lambda.

As shown in FIG. 2, when the multiple transmitter antennas included in each of the first transmitter antenna group Tx1 and the second transmitter antenna group Tx2 are arranged and extended in the vertical direction, the transmitter antennas can secure stability. Also, the transmitter antennas can have a decreased field of view (FOV) in the vertical direction and thus can be less affected by clutter.

The multiple transmitter antennas included in each of the first transmitter antenna group Tx1 and the second transmitter antenna group Tx2 may include (m) number of antennas arranged in parallel to each other. In the first example shown in FIG. 2, m is 6.

The first transmitter antenna group Tx1 and the second transmitter antenna group Tx2 including the multiple transmitter antennas have a vertical phase difference caused by being arranged in the vertical direction at the vertical interval equal in size to the first horizontal interval and also have a horizontal phase difference caused by being arranged in the horizontal direction at the first horizontal interval. In this case, each transmitter antenna channel has the horizontal phase difference caused by the first horizontal interval in the horizontal direction and the vertical phase direction caused by the vertical interval equal in size to the first horizontal interval in the vertical direction at the same time.

The multiple transmitter antennas included in each of the first transmitter antenna group Tx1 and the second transmitter antenna group Tx2 may have a transmitter antenna beam area from which sending signals are transmitted in different vertical and horizontal directions.

The receiver antenna unit 114 may include multiple receiver antennas that receive signals which were transmitted from the transmitter antenna unit 112 and then reflected and returned from the target object.

The receiver antenna unit 114 may include a first receiver antenna group including multiple first receiver antennas Rx1 and multiple second receiver antennas Rx2 arranged at the first horizontal interval and a second receiver antenna group including multiple third receiver antennas Rx3 arranged at one or more second horizontal intervals.

The multiple first receiver antennas Rx1 included in the first receiver antenna group may include (a) number of antennas and the multiple second receiver antennas Rx2 may include (b) number of antennas. In the first example shown in FIG. 2, a is 6 and b is 4.

In the multiple first receiver antennas Rx1 and the multiple second receiver antennas Rx2 included in the first receiver antenna group, the sum of three single receiver antennas arranged in a row may generate a signal similar to that generated by three array antennas (e.g., three-pronged antennas).

The multiple third receiver antennas Rx3 included in the second receiver antenna group may be arranged at the second horizontal intervals between the multiple first receiver antennas Rx1 and the multiple second receiver antennas Rx2. Herein, if the first horizontal interval is K, the second horizontal intervals may include at least 4 K and 7 K. The multiple third receiver antennas Rx3 included in the second receiver antenna group may include (c) number of receiver antennas each having a pair of three-array antennas. In the first example shown in FIG. 2, c is 6.

For example, if the first horizontal interval is 0.5 lambda, N number of third receiver antennas among the multiple third receiver antennas Rx3 included in the second receiver antenna group may be arranged at a second horizontal interval of 3.5 lambda and the remaining M number of third receiver antennas may be arranged at a second horizontal interval of 2.0 lambda.

At least one of the multiple third receiver antennas Rx3 included in the second receiver antenna group may include at least three array antennas. The number of single array antennas may vary depending on an interval between single array antennas. For example, if the multiple first receiver antennas Rx1 and the multiple second receiver antennas Rx2 included in the first receiver antenna group are arranged at an interval of 0.5 lambda and the first receiver antennas Rx1 adjacent to the third receiver antennas Rx3 included in the second receiver antenna group are arranged at an interval of 1 lambda, the multiple third receiver antennas Rx3 included in the second receiver antenna group may include three array antennas.

If each of the multiple third receiver antennas Rx3 includes three array antennas for each receiver channel, a receive gain can be improved. Also, beam characteristics and signal to noise ratio (SNR) can be improved.

A long-range beam area of a typical automotive forward-looking radar is not wide in the range of −10 degrees to +10 degrees. Therefore, when multiple array antennas are grouped into one antennas as long as a wide field of view (FOV) is not needed, a receive gain can be improved. Meanwhile, if an antenna includes multiple single array antennas, a grating lobe which has a bad effect on the performance of antennas may occur when an interval between the single array antennas is greater than 0.5 lambda. However, in the present disclosure, the antennas are arranged as described above (i.e., the minimum interval between the antennas is close to 0.5 lambda). Therefore, a grating lobe can be formed far from a main beam or a main lobe. Accordingly, the horizontal resolution can be improved.

Figure 7:
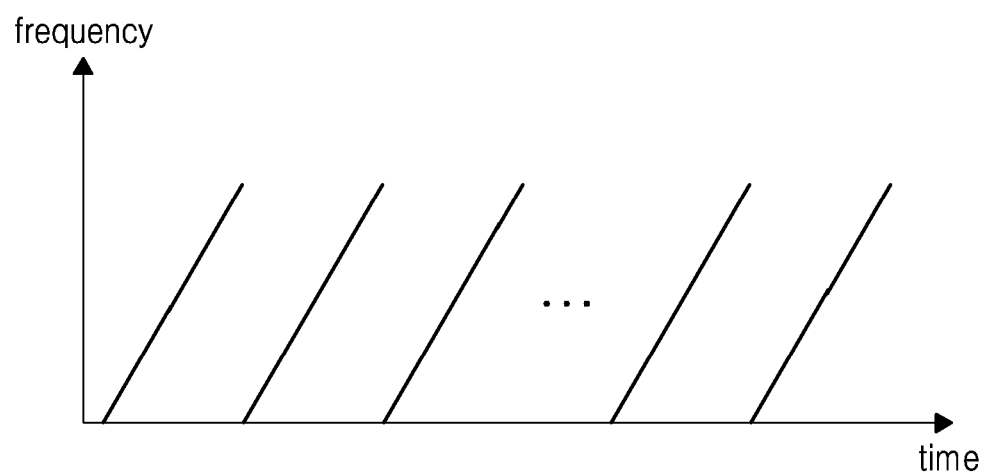
FIG. 7 is a diagram illustrating a signal waveform of the radar according to the first example of the present disclosure.

The transceiver 120 may transmit sending signals through the transmitter antenna unit 112 and receive return signals reflected from the target object trough the receiver antenna unit 114. For example, the transceiver 120 may quickly transmit sending signals at a predetermined interval through the transmitter antenna unit 112 by a first transmission method (e.g., fast-chirp FMCW) as shown in FIG. 7 and may receive return signals reflected from the target object through the receiver antenna unit 114.

The processing unit 130 may derive information about the target object by processing the received return signals. For example, the processing unit 130 may acquire vertical information, such as the height of the target object, and horizontal information, such as the width of the target object, from the received return signals.

Figure 3A:
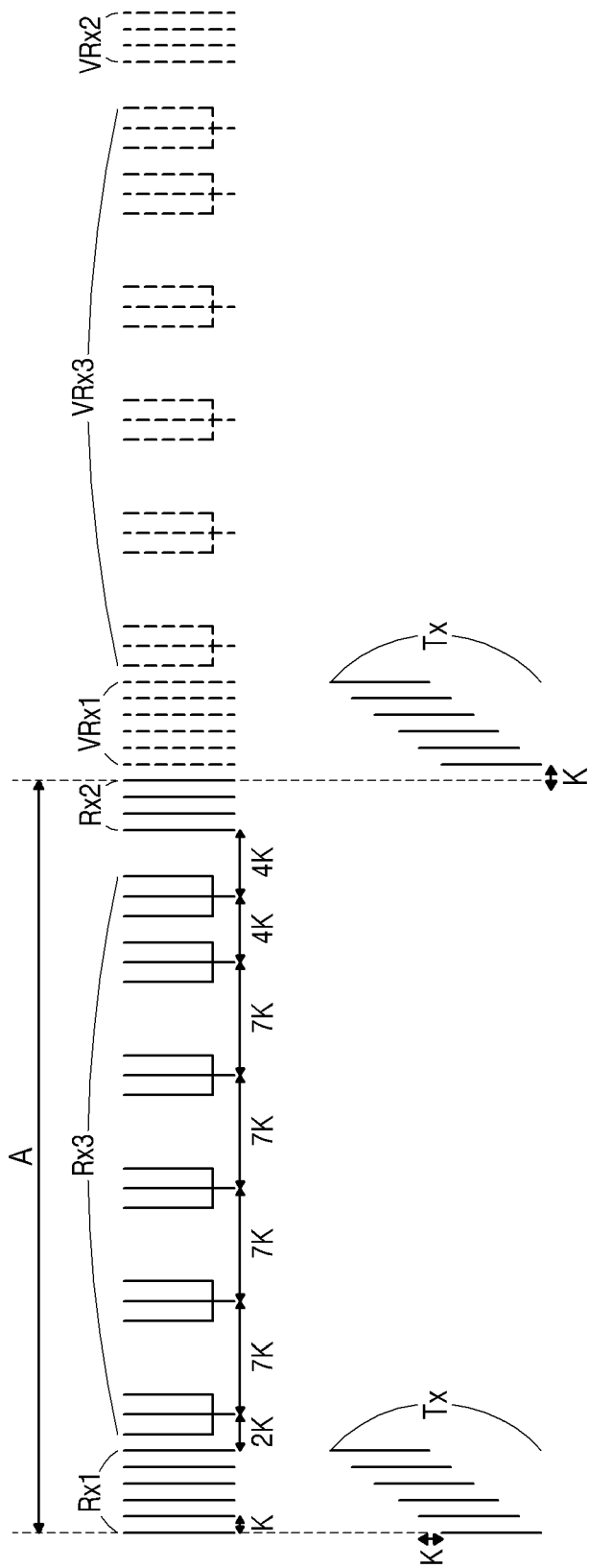
FIG. 3A illustrates an embodiment of detecting horizontal information using the array of antennas according to the first example of the present disclosure.

When multiple-input multiple-output (MIMO) processing is performed through the multiple transmitter antennas Tx1 and Tx2, the virtual receiver antenna forming unit 140 may form one or more virtual receiver antenna groups spatially shifted by A in the same horizontal direction as the first receiver antenna group Rx1 and the second receiver antenna group Rx2. For example, referring to FIG. 3A, when the multiple transmitter antennas Tx1 and Tx2 transmit identical sending signals at the same time, receiver antennas configured to receive receive signals reflected and returning from the target object based on the sending signals can have the same effect as if they were spatially shifted by A in the horizontal direction and received the identical receive signals. The receiver antennas generated at the shifted positions can be expressed as a virtual receiver antenna group VRx1, VRx2, and VRx3. That is, a first virtual receiver antenna VRx1 may be generated at a position spaced away by A from the first receiver antenna group Rx1, a second virtual receiver antenna VRx2 may be generated at a position spaced away by A from the second receiver antenna group Rx2, and a third virtual receiver antenna VRx3 may be generated at a position spaced away by A from the third receiver antenna group Rx3. Accordingly, the first receiver antenna group Rx1, the second receiver antenna group Rx2, the third receiver antenna group Rx3, the first virtual receiver antenna VRx1, the second virtual receiver antenna VRx2, and the third virtual receiver antenna VRx3 are formed at a receiver end. Thus, an aperture extended to double horizontal area can be secured. Therefore, it is possible to precisely measure horizontal information about the target object in a long distance and also possible to improve the resolution of the horizontal information.

The present disclosure can provide a virtual antenna structure to make a position where a grating lobe occurs far from the center where the main beam is located, i.e., to suppress the occurrence of a grating lobe.

Figure 3B:
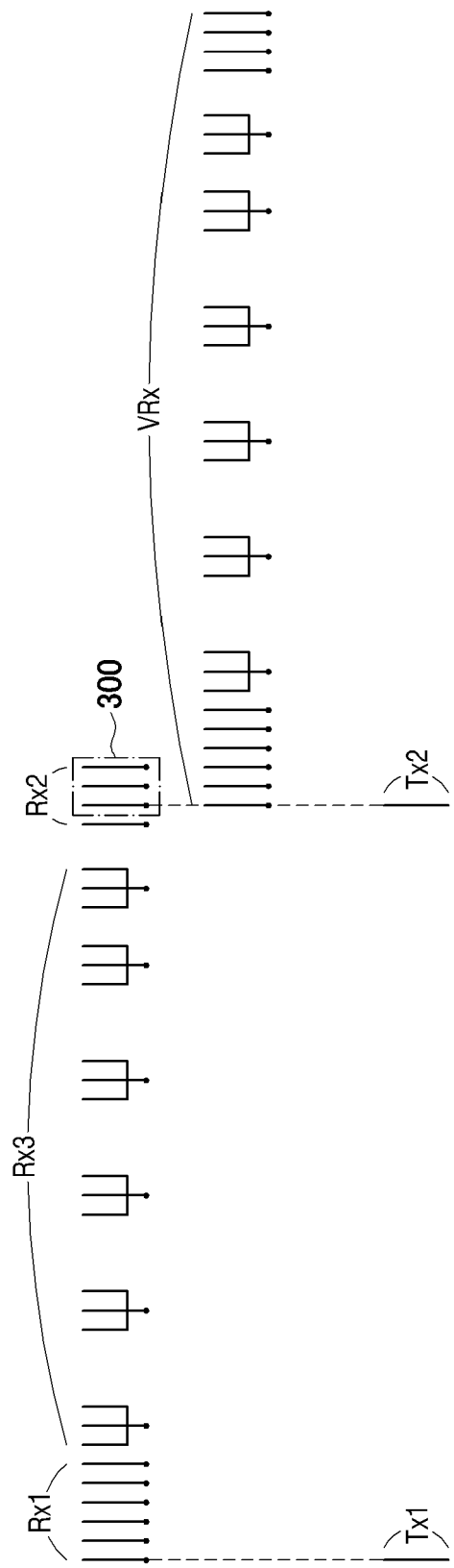
FIG. 3B illustrates an embodiment of detecting horizontal information using the array of antennas according to the first example of the present disclosure.
Figure 3C:
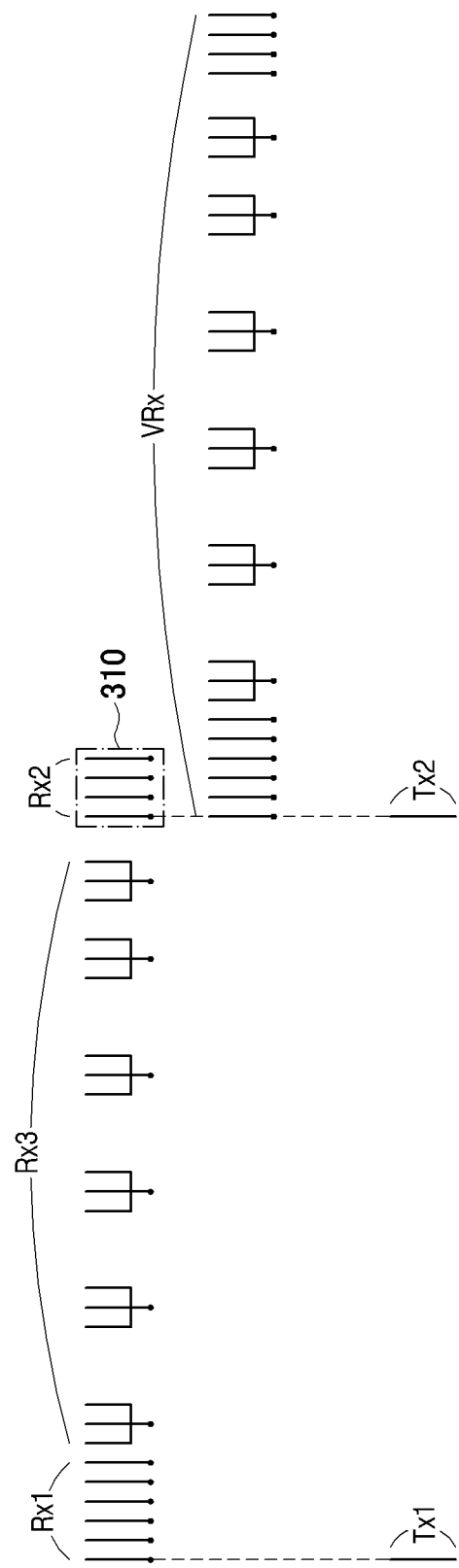
FIG. 3C illustrates an embodiment of detecting horizontal information using the array of antennas according to the first example of the present disclosure.
Figure 3D:
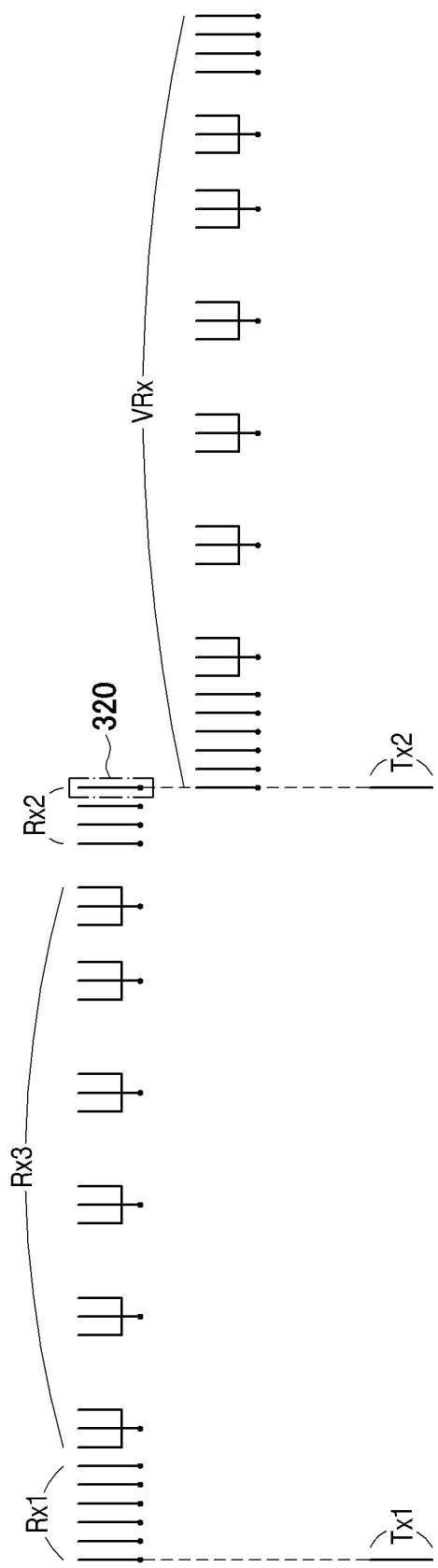
FIG. 3D illustrates an embodiment of detecting horizontal information using the array of antennas according to the first example of the present disclosure.

FIG. 3B to FIG. 3D illustrate various embodiments of MIMO configuration.

Referring to FIG. 3B, the transmitter antennas included in the second transmitter antenna group Tx2 may be arranged at a first interval which is adjusted to locate them on the same line as some receiver antennas 300 among the multiple receiver antennas included in the second receiver antenna group Rx2. A MIMO configuration shown in FIG. 3B can be constructed by adjusting the interval between the transmitter antennas, and the formation of a virtual receiver antenna group VRx results in a double increase in number of receiver antennas. In this case, 91 receiver channels may be formed. Further, the MIMO configuration shown in FIG. 3B can use a binary phase shift (0 deg/180 deg) and can be used as a phase reference.

Referring to FIG. 3C, the transmitter antennas included in the second transmitter antenna group Tx2 may be arranged at a second interval which is adjusted to locate them on the same line as some receiver antennas 310 among the multiple receiver antennas included in the second receiver antenna group Rx2. A MIMO configuration shown in FIG. 3C can be constructed by adjusting the interval between the transmitter antennas, and the formation of a virtual receiver antenna group VRx results in a double increase in number of receiver antennas. In this case, 88 receiver channels may be formed. Further, the MIMO configuration shown in FIG. 3C can use a binary phase shift (0 deg/180 deg) and can be used as a phase reference.

Referring to FIG. 3D, the transmitter antennas included in the second transmitter antenna group Tx2 may be arranged at a third interval which is adjusted to locate them on the same line as some receiver antennas 320 among the multiple receiver antennas included in the second receiver antenna group Rx2. A MIMO configuration shown in FIG. 3D can be constructed by adjusting the interval between the transmitter antennas, and the formation of a virtual receiver antenna group VRx results in a double increase in number of receiver antennas. In this case, 91 receiver channels may be formed. Further, the MIMO configuration shown in FIG. 3D can use a binary phase shift (0 deg/180 deg) and can be used as a phase reference.

The interpolation unit 150 may form antenna patterns arranged at the first horizontal interval within a horizontal area corresponding to multiple first receiver antennas, multiple second receiver antennas, and multiple third receiver antennas by applying non-uniform linear array (NLA) interpolation to the multiple first receiver antennas, the multiple second receiver antennas, and the multiple third receiver antennas. When the NLA interpolation is applied to the multiple receiver antennas, the maximum radiation aperture can be obtained with a limited number of receiver channels.

Figure 4:
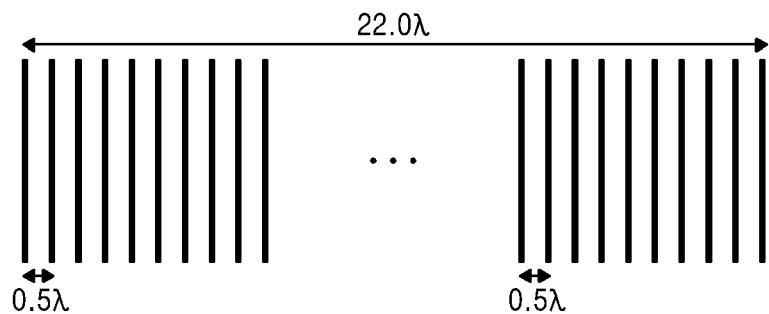
FIG. 4 illustrates an antenna pattern formed by applying non-uniform linear array interpolation in accordance with various embodiments described herein.

For example, referring to FIG. 2 and FIG. 4 together, if the NLA interpolation is applied to the multiple first receiver antennas, the multiple second receiver antennas, and the multiple third receiver antennas, multiple antenna patterns may be formed at an interval of 0.5 lambda within a horizontal area where the multiple first receiver antennas, the multiple second receiver antennas, and the multiple third receiver antennas are located. The total horizontal interval between the multiple antenna patterns formed within the horizontal area may be 22.0 lambda.

Figure 5:
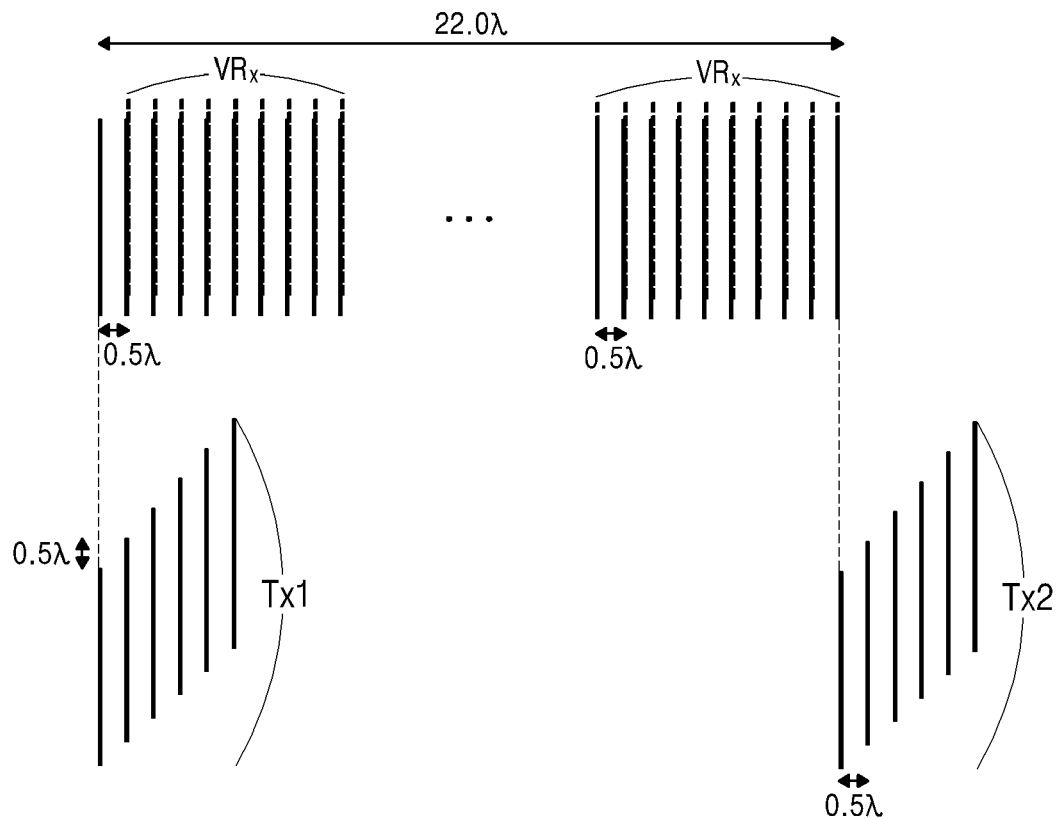
FIG. 5 illustrates an embodiment of detecting vertical information using the array of antennas according to the first example of the present disclosure.

Referring to FIG. 2 and FIG. 5 together, when MIMO processing is performed through the multiple transmitter antennas Tx1 and Tx2 arranged at a vertical interval, the virtual receiver antenna forming unit 140 may form one or more virtual receiver antenna groups VRx arranged in the same horizontal direction as the first receiver antenna group Rx1 and the second receiver antenna group Rx2. In this case, multiple virtual receiver antennas included in the one or more virtual receiver antenna groups VRx formed in the same horizontal direction as the first receiver antenna group Rx1 and the second receiver antenna group Rx2 may have a vertical offset at a vertical interval. Accordingly, in the present disclosure, it is possible to estimate the angle of the target object using a phase difference between the virtual receiver antenna groups VRx formed in the same horizontal direction as the first receiver antenna group Rx1 and the second receiver antenna group Rx2 and having the vertical offset.

Referring to FIG. 2, FIG. 4, and FIG. 5 together, the virtual receiver antenna forming unit 140 may form one or more virtual receiver antenna groups VRx having a vertical offset of a vertical interval in the antenna patterns arranged at the first horizontal interval by applying the NLA interpolation to the multiple first receiver antennas, the multiple second receiver antennas, and the multiple third receiver antennas.

Figure 8:
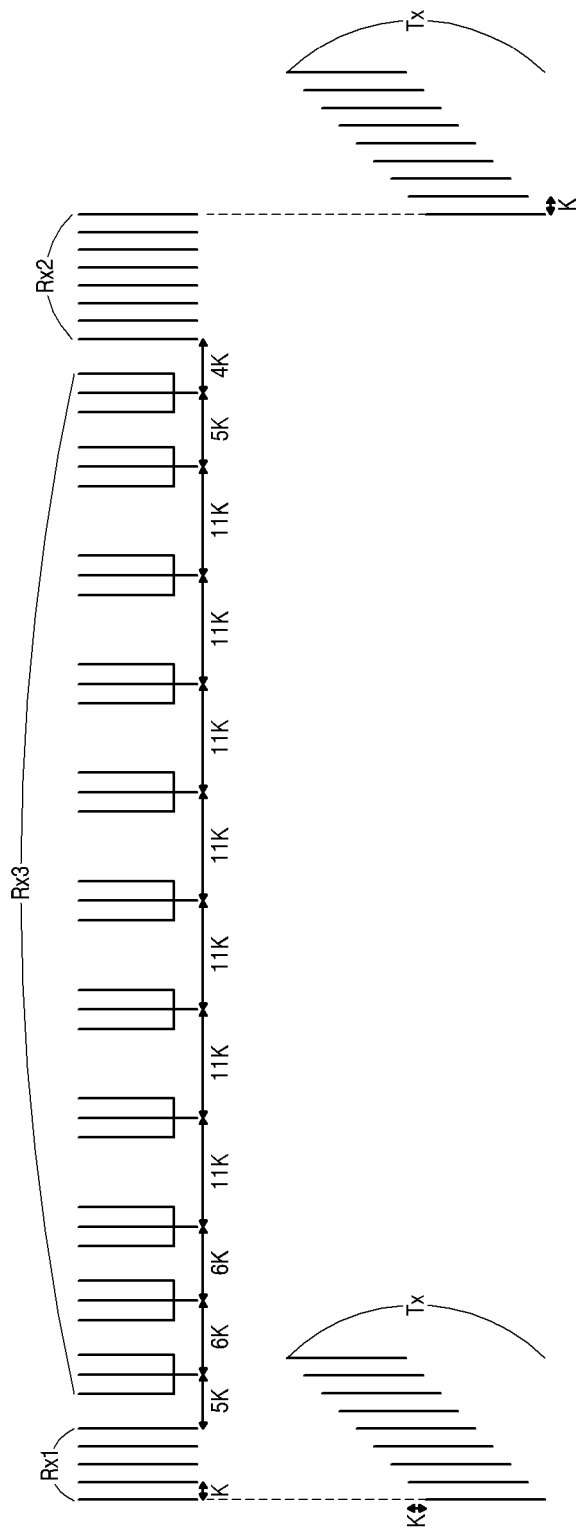
FIG. 8 illustrates a second example of the array of multiple transmitter antennas and multiple receiver antennas of an antenna apparatus included in a radar in accordance with various embodiments described herein.

FIG. 8 illustrates a second example of the array of multiple transmitter antennas and multiple receiver antennas of the antenna apparatus 110 included in a radar 200 in accordance with various embodiments described herein. In the second example shown in FIG. 8, an antenna structure including transmitter antennas and receiver antennas is made into multiple chips, and when the multiple chips are cascaded, an additional chip may be used as a master chip for synchronization.

Referring to FIG. 8, the multiple transmitter antennas included in each of the first transmitter antenna group Tx1 and the second transmitter antenna group Tx2 may be arranged in a row in the vertical direction at the first horizontal interval.

Further, the multiple transmitter antennas included in each of the first transmitter antenna group Tx1 and the second transmitter antenna group Tx2 may be spaced away with a vertical offset of a vertical interval of which size is equal to a size of the first horizontal interval.

For example, if the vertical interval is 0.5 lambda, the multiple transmitter antennas included in each of the first transmitter antenna group Tx1 and the second transmitter antenna group Tx2 may be formed into an antenna pattern having a total vertical area of 4.0 lambda.

The multiple transmitter antennas included in each of the first transmitter antenna group Tx1 and the second transmitter antenna group Tx2 may include (m) number of antennas arranged in parallel to each other. In the second example shown in FIG. 8, m is 9.

The multiple first receiver antennas Rx1 included in the first receiver antenna group may include (a) number of antennas and the multiple second receiver antennas Rx2 may include (b) number of antennas. In the second example shown in FIG. 8, a is 5 and b is 8.

The multiple third receiver antennas Rx3 included in the second receiver antenna group may be arranged at the second horizontal intervals between the multiple first receiver antennas Rx1 and the multiple second receiver antennas Rx2. Herein, if the first horizontal interval is K (e.g., 0.5), the second horizontal intervals may include at least 4 K, 5 K, 6 K, and 11 K. The multiple third receiver antennas Rx3 included in the second receiver antenna group may include (c) number of receiver antennas each having a pair of three-array antennas. In the second example shown in FIG. 8, c is 11.

above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

What is claimed is:

1. A radar, comprising:
a transmitter antenna unit that includes multiple transmitter antennas;
a receiver antenna unit that includes a first receiver antenna group including multiple first receiver antennas arranged at a first horizontal interval and multiple second receiver antennas arranged at the first horizontal interval and a second receiver antenna group including multiple third receiver antennas arranged at one or more second horizontal intervals, the first horizontal interval being smaller than each of the one or more second horizontal intervals;
a transceiver that transmits sending signals through the transmitter antenna unit and receives returning signals reflected from a target object trough the receiver antenna unit; and
a processing unit that derives information about the target object by processing the received returning signals.

2. The radar of claim 1,
wherein the multiple transmitter antennas are arranged at a vertical interval, of which size is equal to a size of the first horizontal interval.

3. The radar of claim 2, further comprising:
a virtual receiver antenna forming unit that forms one or more virtual receiver antenna groups arranged in a same horizontal direction as the first receiver antenna group and the second receiver antenna group and having a vertical offset of the vertical interval when multiple-input multiple-output processing is performed through the multiple transmitter antennas arranged at the vertical interval.

4. The radar of claim 3,
wherein at least one of the multiple third receiver antennas comprises at least three array antennas.

5. The radar of claim 4,
wherein if the first horizontal interval is K, the second horizontal intervals include at least 4 K and 7 K.

6. The radar of claim 5,
wherein the multiple third receiver antennas are arranged at the second horizontal intervals between the multiple first receiver antennas and the multiple second receiver antennas.

7. The radar of claim 6, further comprising:
an interpolation unit that forms antenna patterns arranged at the first horizontal interval within a horizontal area corresponding to the multiple first receiver antennas, the multiple second receiver antennas, and the multiple third receiver antennas by applying non-uniform linear array (NLA) interpolation to the multiple first receiver antennas, the multiple second receiver antennas, and the multiple third receiver antennas.

8. The radar of claim 7,
wherein the virtual receiver antenna forming unit forms one or more virtual receiver antenna groups having a vertical offset of the vertical interval in the antenna patterns arranged at the first horizontal interval.

9. The radar of claim 1, where each of the multiple first receiver antennas and multiple second receiver antennas is a single array antenna, and at least one of the multiple third receiver antennas comprises at least three array antennas.

10. An antenna built in a radar, comprising:
a transmitter antenna unit that includes multiple transmitter antennas; and
a receiver antenna unit that includes a first receiver antenna group including multiple first receiver antennas at a first horizontal interval and multiple second receiver antennas arranged at the first horizontal interval and a second receiver antenna group including multiple third receiver antennas arranged at one or more second horizontal intervals, the first horizontal interval being smaller than each of the one or more second horizontal intervals.

11. The antenna of claim 10, where each of the multiple first receiver antennas and multiple second receiver antennas is a single array antenna, and at least one of the multiple third receiver antennas comprises at least three array antennas.

12. The antenna of claim 10, wherein the multiple third receiver antennas are arranged at the second horizontal intervals between the multiple first receiver antennas and the multiple second receiver antennas.

* * * * *